United States Patent Office 3,676,064
Patented July 11, 1972

---

3,676,064
METHODS FOR THE TREATMENT OF SPENT SULFITE PULPING LIQUORS AND THE RECOVERY OF CHEMICAL PULPING VALUES THEREFROM
Philip E. Shick, Toledo, Ohio, assignor to Owens-Illinois, Inc., Toledo, Ohio
Filed Apr. 16, 1970, Ser. No. 29,063
Int. Cl. C01d 5/14, 7/00
U.S. Cl. 23—129                 1 Claim

ABSTRACT OF THE DISCLOSURE

Improved processes for the treatment of spent pulping liquors and the recovery of sulfite values therefrom wherein the disclosure sets forth a first method consisting essentially of the combined process of pyrolyzing and treating in a fluidized bed a spent neutral semi-sulfite liquor in a single apparatus; then, transferring the gaseous product to a separator for removing entrained particles for return to the fluidized bed where the particles are converted to sodium carbonate followed by a removal of the sodium carbonate from the bed for scrubbing gases to absorb sulfur dioxide to produce sodium sulfite, and wherein the process further consists of recirculating the hot gases produced in the combined pyrolyzing fluidized bed treatment after the entrained particles have been separated in the cyclone separator by conveying some of the gases to the fluidized bed and also burning some of the gases in a furnace to produce sulfur dioxide, which is then absorbed in a solution of sodium carbonate from the fluidized bed to produce sodium sulfite. The second process described, in the invention relates to pyrolyzing a spent liquor in a pyrolyzing chamber followed by separating the entrained particles in a cyclone separator and conveying said separated particles to a multistage fluidized bed to produce a solid product consisting primarily of sodium carbonate and gaseous products, which gaseous products are conveyed from the fluidized bed to the pyrolyzing chamber for treatment of the incoming spent pulping liquor. The gases produced in the pyrolyzing chamber are conveyed from the cyclone to a recirculating system with some of the said gases being transported back into the pyrolyzing chamber mixed with the gases from combustion of the solid particles entering the fluidized bed from the cyclone, and the remaining gases transported to a recovery boiler for conversion of the sulfur compounds to sulfur dioxide, which is then scrubbed with a solution of sodium carbonate from the fluidized bed reactor, for regeneration of sodium sulfite for preparation of a pulping liquor. In both of these processes, the recirculation of the pyrolytic gases into the pyrolysis chamber aids in maintaining an improved, more effective and economical pyrolysis system.

BACKGROUND OF THE INVENTION

Figure 1:
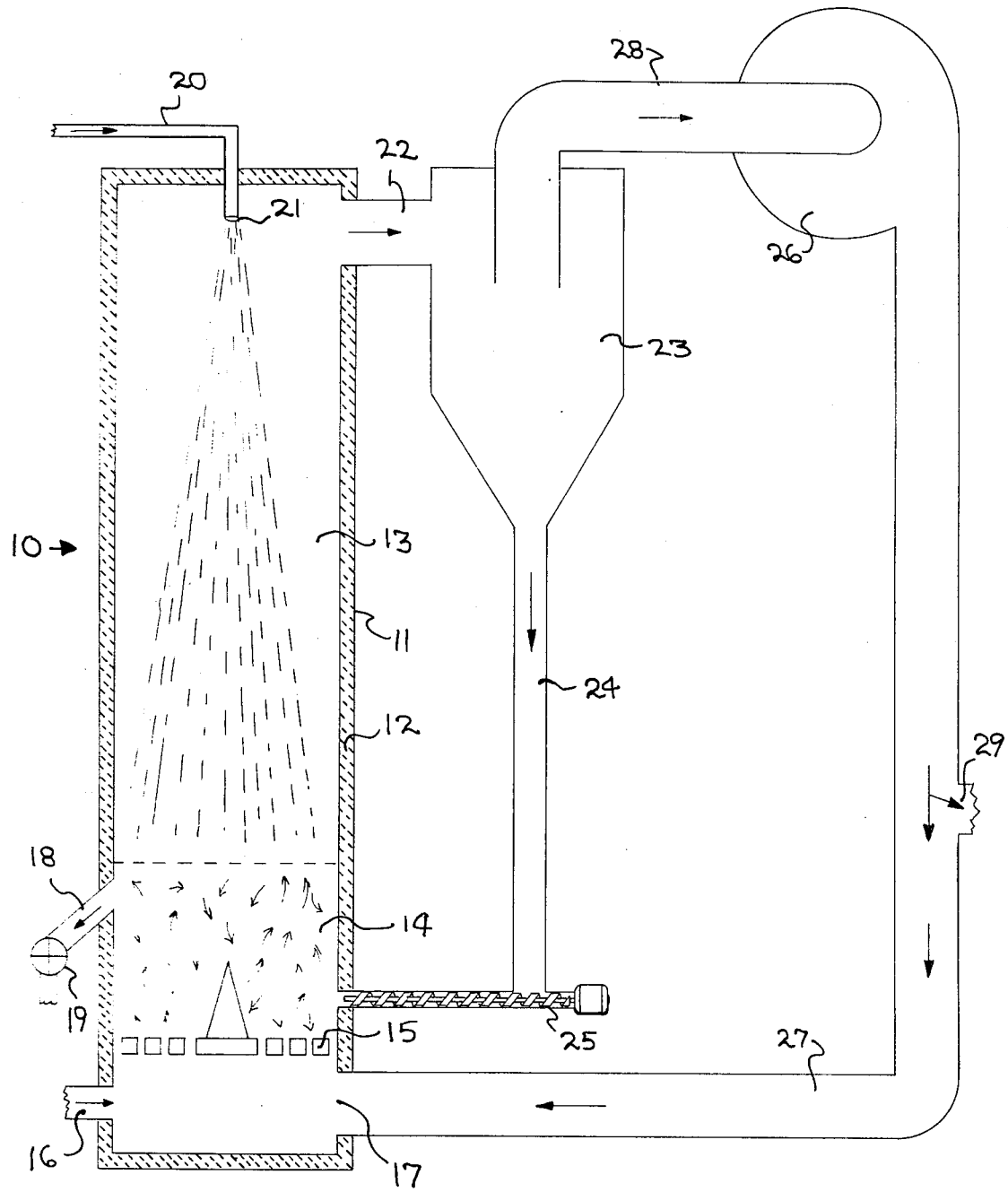

The present invention relates to a novel process for treating spent pulping liquors containing organic and inorganic materials to facilitate in a simple and economic manner the recovery and the reclaiming of the valuable chemicals in the spent liquor in a form readily amenable for eventual resule in a cellulosic pulping process. More particularly, the invention pertains to an improved process for the treatment of spent pulping liquors and the recovery of valuable pulping chemicals used in a sulfite pulping process such as a neutral semi-sulfite pulping process. Specifically, the invention concerns a novel process for the recovery of sulfite liquors based on sudden high temperature pyrolysis and other physical treatment processes of the residual liquor solids to convert them to products containing sodium carbonate and gaseous product which, upon completion of the pyrolysis and combustion treatment, contain sulfur dioxide and the formation of sodium sulfite by the combination of the sodium carbonate in a solution with sulfur dioxide.

In the manufacture of cellulosic pulp from woods or from other cellulosic type fiberous raw materials, the raw materials are conventionally cooked or digested with liquors commonly known as cooking or pulping liquors. These cooking liquors contained various chemical compounds, depending on the raw material and the desired pulp obtainable from the cooking of the raw wood. The cooking liquors generally include the chemicals sodium sulfide, sodium hydroxide, sodium carbonate, sodium bisulfite, sodium sulfite, sodium bicarbonate and other chemical reagents; and, the common characteristics of the cooking or pulping process, irregardless of the nature of the cooking liquor employed for the pulping of the raw material, is the production of a spent liquor which is obtained after the cooking process when the cellulosic pulp is separated from the cooking liquor. These spent cooking liquors, sometimes called black liquors, contain valuable chemical products and calorific value which must be recovered for the efficient operation of the pulping process.

Among the prior art processes, that have been suggested or employed for the recovery of chemical and calorific values from sodium based spent sulfite cooking liquors, is the Voci and Iannazi process as reported in Chemical Engineering Progress, vol. 61, No. 5, pp. 110–120, 1965 wherein it is proposed to recover chemicals based on the conversion of the spent liquor solids primarily to sodium carbonate with perhaps some residual carbon and to gaseous products which are eventually oxidized to carbon dioxide, water and sulfur dioxide. This proposed process does not, however, anticipate the recirculation and reuse of the calorific value of the gases from pyrolysis of the spent cooking liquor coupled with a joint fluidized bed pyrolysis process.

The above-mentioned Chemical Engineering Process reference alludes to a fluidized bed process as reported in the Battelle Technical Review, vol. 13, No. 11, pp. 3–9, 1964, wherein it was reported that a fluidized bed system for the combustion of neutral sulfite black liquor promises to be of value to the pulping art, because it may produce a resultant solid product which is essentially sodium sulfate and sodium carbonate which compounds can be subsequently converted to valuable sodium sulfite for reuse in a pulping process. However, this latter reference, like the former reference, does not mention any circulation or reuse of the calorific value of the product gases joined to a fluidized bed pyrolysis process for reclaiming the chemical and calorific values from a spent pulping liquor.

Other prior art methods directed to the chemical recovery of a spent sulfite pulping process include the Bergholm process for recovery of chemicals from a sodium base waste liquor, as reported in Svensk Papperstit., vol. 66, No. 4, pp. 125–132, 1963, wherein it is reported that the recovery of chemicals and heat from a sodium base spent sulfite liquor is based upon the rapid heating and instant conversion into a powdered state, with all sodium in carbonate form and a combustional gas containing all sulfur in hydrogen sulfide form. This process employs what is known as shock pyrolysis. Part of the heat needed for the pyrolysis is generated by a partial combustion of the spent liquor substance in the pyrolyzing tower with the additional heat being supplied by the burning of oil. The Bergholm process is similar to the process reported in French Pat. 1,315,987, wherein is disclosed the sudden thermal decomposition and a dispersion of the solid materials of the spent solution with a rapid drying of the solution particles in hot gases consisting of carbon dioxide, water vapor, gaseous nitrogen and small amounts of sulfurous gas and gaseous oxygen. The ashes of the process consist primarily of carbonate, in the alkali form. In this French patent, there is also disclosed that the gases leaving a fluidized bed are burned in an excess of air and hot combustion gases produced from said burning are later introduced into the pyrolysis reactor. The process suffers from the inherent need for external air for supporting the combustion process and the need for external heating because the pyrolysis reactor process as described in the patent does not make provision for either confining and recirculating the hot gases leaving the pyrolysis reactor, especially after particle separation in a cyclone or the like apparatus, nor does the patent make provisions for the eventual introducing of the recirculated gases into a multistage fluidized bed for a more efficient and more economical pyrolysis of spent liquors.

Other prior art methods which pertain to the recovery of values from spent sodium sulfite liquors, are set forth in, for example, U.S. Pat. 3,250,591 wherein it is described that spent liquors, in finely divided form, may be sprayed into a hot chamber for pyrolyzing in a reduced atmosphere without any means for reusing the product gases as a source of energy in the pyrolysis. In Canadian Pat. 619,-686, there is disclosed the pyrolysis by the injection of a spent cooking liquor into a pyrolyzing tower with a simultaneous injection of oxygen in the form of air in a quantity sufficient for the process to be self-maintaining. This quantity of air serves as a fluidizing gas in which the liquor could be pyrolyzed as in a fluidizing bed. This patent, like Pat. 3,250,591 does not disclose any conditions or means for the recirculation of heat of gases leading from the pyrolysis reactor into a fluidized bed or back into the pyrolysis reactor. A similar patent is U.S. 3,083,077, which shows oil and air, being mixed in a combustion chamber and fed into a pyrolyzing reactor for mixing and combustion with a sprayed spent liquor. The resultant product is carried from the reaction chamber to a cyclone separator with the gases passing to secondary combustion, either for heat recovery, or for return to the pyrolysis reactor. No provision is made in this patent for the subsequent recirculation of the pyrolysis product gases directly to a fluidized bed pyrolysis step or directly to a pyrolysis tower.

Other processes are based on pyrolysis or gasification techniques, which use temperatures of about 700° to 800° C. (1292 to 1472° F.), in which spent pulping liquor is atomized either into a reactor with heated walls, i.e., the "atomized suspension technique," or into hot gases in a reaction chamber, i.e., "shock pyrolysis technique," to decompose and to give a solid containing primarily sodium carbonate and gases containing hydrogen sulfide. The hydrogen sulfide is burned to give sulfur dioxide, which is then combined with a solution of the sodium carbonate to regenerate the desired cooking liquor.

The literature basis for such gasification or pyrolysis processes as set forth in detail above is described in a thermodynamic paper by T. W. Bauer and R. M. Dorland, published in the Canadian Journal of Technology, vol. 32, No. 3, pp. 91–101, 1954. In particular, Bauer and Dorland showed that, for temperatures less than approximately 1340° F., in an equilibrium mixture of spent liquor pyrolysis products and at the proper controlled oxygen addition to give a gaseous mixture of $CO_2$, $CO$, $H_2$, and $H_2O$, the solid product should contain only sodium carbonate. At lower temperatures, i.e., at 980° F. and below, carbon also begins to appear in the equilibrium mixture, particularly, at lower oxygen levels. At any temperature, at very low oxygen levels, i.e., in the presence of $CO$ and $H_2$ as opposed to $CO_2$ and $H_2O$, sodium sulfide will be found in the equilibrium solid product; whereas, at high oxygen level, i.e., in the presence of $CO_2$ and $H_2O$ as opposed to $CO$ and $H_2$, sodium sulfate becomes a stable solid product. It has been an object of the above pyrolysis processes to operate at a temperature and oxygen level so as to obtain a solid product consisting of sodium carbonate. In practice, this has been only partially achieved under the best conditions of fine atomization and rapid pyrolysis, the product containing significant percentages of both carbon and sulfate.

Other prior art attempts, in addition to those described supra, include attempts to achieve a similar gasification of sulfur and carbon by introducing sodium base sulfite spent liquor into a fluidized bed, which have not been successful. Various problems associated with operating a fluid bed under reducing conditions, such as the problem of balling up or stickiness of particles in the fluid bed, as well as incomplete removal of the sulfur and carbon, have not been overcome to make the system suitable for manufacturing acceptance. Other fluid bed processes consist of spraying sulfite spent liquors into the free board above a fluidized bed or directly into a fluidized bed operating under oxidizing conditions and at a temperature of approximately 1350° F. Under these conditions essentially all of the sulfur in the spent liquor remains in the fluidized bed product as sodium sulfate. The latter compound, sodium sulfate, is inert and unusable in the pulping reaction. One proposal has been made for the treatment of spent sulfite liquors in such an oxidizing bed to give a product containing sodium sulfate and sodium carbonate, followed by a subsequent fluid bed treatment under reducing conditions to reduce the sodium sulfate to sodium sulfide and to remove the sulfur in the form of hydrogen sulfide. The hydrogen sulfide may be burned to give sulfur dioxide, which may be combined with the sodium carbonate produced in the process. The feature of this just described process that prevents its commercial advancement is the requirement for additional fuel to carry out the second reduction and the sulfur elimination step.

In view of the above discussion, it therefore becomes an immediate object of the present invention to make available to the pulping art an acceptable method for the recovery of chemicals and calorific values from a sprent pulping liquor.

It is a further object of the invention to produce a chemically simple and economically feasible process for recovering chemicals from the waste liquor obtained from a cooking of cellulose type materials such as wood or cellulosic fibers and the like.

It is still a further purpose of the invention to provide an improved chemical physical recovery process for treating spent sulfite liquors based on a fluidized bed treatment coupled with pyrolysis and other processing steps like separation, recirculation, etc. with a treatment of residual liquor solids to convert them to sodium carbonate and gaseous products which, upon completion of combustion, contain sulfur dioxide and the formation of sodium sulfite by the combination of sodium carbonate in the solution with sulfur dioxide.

Still yet a further purpose of the invention is to provide an improved process consisting essentially of a multi-stage fluidized bed treatment of a spent pulp liquor coupled to the pyrolysis reactor treatment of said liquor.

Another purpose of the invention is to make available to the art a process for treating spent cooking liquor wherein said process combines a spray drying and fluidized bed reactor for the treatment of the pulping liquor with a recirculation of hot gases produced in the combined process by directing a portion of said hot gases into the bottom of the combined spray drying fluidized bed reactor.

It is another object to provide a rapid and continuous process so as to make it possible to recover costly chemicals from spent pulping liquors.

These and other objects of the invention will become more apparent from the following detailed description and the accompanying claim.

ABSTRACT OF THE INVENTION

The invention is concerned with first a process for treating spent liquors consisting of the utilization in combination of the spray drying and pyrolysis of a spent liquor in a fluidized bed reactor to effect the conversion of the liquor solids to solid sodium carbonate and gaseous products, which upon completion of the combustion contain sulfur dioxide and the formation of sodium sulfite by the combination of the sodium carbonate in the solution with the sulfur dioxide. The invention also concerns, secondly, a multi-stage fluidized bed treatment of spent sulfite pulping liquors with the waste liquor sprayed into a pyrolyzing chamber where it is dried and pyrolyzed by hot gases coming from the fluidized bed portion of the processing apparatus. The product produced in the pyrolyzing reactor consists primarily of sodium carbonate and carbon, which is collected in a cyclone separator and transferred to the fluidized bed where the carbon is removed by controlled combustion with air, with water added for temperature control, if desired. The invention concerns, specifically, in both the first and second processes, the pyrolyzing, a fluidized bed, a cyclone separator for separation of the particles, and then recirculation of hot gases from the cyclone separator by means of a recirculating fan for entrance into the combined fluidized bed pyrolyzing process of the first and second described processes. By recirculating the hot gases, more efficient and economical processes are made available to the pulping art.

DETAILED DESCRIPTION OF THE INVENTION

In one aspect the invention utilizes in combination the joined process steps of spray drying and pyrolysis with further treatment of the resultant product in a fluidized bed to complete the conversion of the liquor solids to the desired solids and gaseous products. The gaseous products are further burned for conversion of sulfur compounds to $SO_2$ in a suitable combustion chamber with a boiler for recovery of heat. The pyrolysis reaction that occurs at elevated temperatures is the reaction of the organic portion of the spent liquor with the inorganic portion in the presence of water vapor to give a solid product containing sodium carbonate with more or less carbon and a small residual of sodium sulfide, sodium sulfate or sulfur and gases containing hydrogen sulfide, carbon dioxide, carbon monoxide, hydrogen and water vapor.

The aspect of performing the invention utilizing in combination the step of spray drying and pyrolysis is illustrated by FIG. 1. In FIG. 1 there is shown a combined spray drying fluidized bed reactor 10. The reactor 10 is constructed of an external steel wall 11 with an inner insulating refractory liner 12 faced with a high alumina, chrome fire brick, refractory cement or the like. The reactor 10 may be any desired geometric shape, circular, rectangular, conical or the like. In the upper area or portion of reactor 10 is a spray dry zone 13. The lower area of reactor 10 is a fluidized bed 14 reaction zone. The fluidized bed is filled with granular product supported on a gas distributor 15. An air inlet 16 and a recirculating gas inlet 17 are provided below the gas distributor 15. A dotted line in FIG. 1 corresponds to the demarcation between the spray zone 13 and the fluidized bed zone 14. The fluidized bed reactor 10 is also equipped with a solid product outlet exit 18 which outlet is equipped with a flow control valve 19. At the top of reactor 10 there is an incoming feed line 20 entering the top of reactor 10 and terminating in a spray nozzle 21. The top of reactor 10 is also connected to a cyclone separator 23 through conduit 22. The cyclone, used for separating entrained solids extends downwardly 24 into a screw feeder 25 for transporting particles into the fluidized bed 14. The cyclone 23 is connected laterally, to a recirculating fan 26 for recycling combustible gases through a transport means 27 into the bottom of the reactor 10 for mixing with air entering the reactor at inlet 16. Transport means 27, which may be a ceramic-lined steel pipe, a stainless steel pipe, or the like, is also equipped with an outlet 29 for removing gases from the spray-drying and fluidized bed reactor system for conveying to a furnace (not shown) where they are mixed with additional air and burned.

In operation, the apparatus of FIG. 1 performs the invention by conveying spent pulping liquor through pressurized feed line 20 and into the combined spray drying pyrolyzing reactor 10 by atomizing the liquor with a jet nozzle 21. The atomizing nozzle may be any conventional nozzle. The nozzle atomizes the liquor so that the spray cone of spent liquor will come into immediate contact with the hot gases in the top and middle zone regions of reactor 10, and it will be dried and substantially pyrolyzed to form hollow or porous globules of carbonaceous char, containing the inorganic chemicals of the spent cooking liquor. The temperature in the spray drying and pyrolyzing zone 13 is about 900° F. to 1100° F. In the fluidized bed 14 at the bottom of the reactor, the carbonized droplets produced in the spray zone 13 of reactor 10 are intimately mixed with any entrained treated particles obtained from the cyclone separator 23. The carbonized droplets and entrained particles undergo further pyrolysis with removal of carbon by contact with the hot gases in the fluidized bed reactor 14. These gases and the necessary heat for the reaction are produced by combining the recycled gases entering at inlet 17 with air entering at 16, which react to produce carbon dioxide and water vapor. These react with the carbon to produce carbon monoxide and hydrogen in the fluidized bed 14. The temperature of the fluidized bed is maintained at about 1100° to 1200° F. by the proper balance of recirculated gas and air.

The solid product of the fluidized bed reaction consisting chiefly of sodium carbonate and some carbon residue and minor quantities of sulfur compounds is removed from the fluidized bed by outlet 18 through rotating valve 19. At the top of reactor 10, solid and gaseous particles are conveyed by pipe line 22 to cyclone separator 23. In cyclone separator 23, entrained solids are separated out and conveyed through screw feeder 25 back into fluidized bed reactor 14 for further treatment. Hot gases leaving the top of cyclone separator 23 travel laterally through transport pipe 28 into a recirculating fan 26 through pipe 27 and back into the fluidized bed reactor 14 for entering through gas distributor 15. Excess gases from the combined spray-drying and fluidized bed reactor moving through pipe 27 are taken from the system at outlet 29 where they are fed into a furnace (not shown) and mixed with additional air and burned to convert the volatile sulfur compounds present in the gases into sulfur dioxide for mixing with the sodium carbonate leaving the fluidized reactor through outlet 18. In the just described operation, some of the reactions are endothermic and some exothermic. The recycling of the gases, serves to distribute the heat from one zone to another as well as to furnish the necessary gaseous reactants for the desired pyrolysis.

In the theoretical data presented below, are set forth the approximate heat balance considerations for the spray-drying pyrolysis controlled oxidation recovery of spent sulfite waste liquors as performed according to the spirit of the invention. The data as calculated are based on a heat of combustion of liquor of 5000 B.t.u. per dry pound of liquor; air requirement for complete combustion of 4 pounds per dry pound of liquor; a liquor solid content of about 40% ash and 60% organic; a specific heat of solids of 0.25; a specific heat of air and fixed gases of 0.25;

a specific heat of water vapor of 0.5 and a heat of vaporization of 1000 B.t.u. per pound for water. The data in Table 1 show the equilibrium temperature for co-current flow of gases and solids or a very high rate of recirculation with complete mixing of products for 50% concentration of liquor and 1 pound of liquor solid.

TABLE 1

| Percent of theoretical air | 20 | 30 | 40 | 50 | 60 | 70 |
|---|---|---|---|---|---|---|
| Pounds of air | 0.8 | 1.2 | 1.6 | 2.0 | 2.4 | 2.8 |
| Heat released (B.t.u.) | 1,000 | 1,500 | 2,000 | 2,500 | 3,000 | 3,500 |
| Heat to evaporate water (B.t.u.) | 1,000 | 1,000 | 1,000 | 1,000 | 1,000 | 1,000 |
| Balance for sensible heat (B.t.u.) | 0 | 500 | 1,200 | 1,500 | 2,000 | 2,500 |
| Weight of water vapor ×0.5 (B.t.u./° F.) | 0.50 | 0.50 | 0.50 | 0.50 | 0.50 | 0.50 |
| Weight of solids and gas from solids ×0.25 (B.t.u./° F.) | 0.25 | 0.25 | 0.25 | 0.25 | 0.25 | 0.25 |
| Weight of air and gas from air ×0.25 (B.t.u./° F.) | 0.20 | 0.30 | 0.40 | 0.50 | 0.60 | 0.70 |
| Total heat capacity of products (B.t.u./° F.) | 0.95 | 1.05 | 1.15 | 1.25 | 1.35 | 1.45 |
| Equilibrium temperature rise (° F.) | 0 | 476 | 870 | 1,200 | 1,480 | 1,720 |
| Equilibrium temperature (° F.) with preheat to 250° F | 250 | 726 | 1,120 | 1,450 | 1,730 | 1,970 |
| Equilibrium temperature (° F.) when starting at 100° F | 100 | 576 | 970 | 1,300 | 1,580 | 1,8 |

In Table 2 is set forth the data for counter-current flow and equilibrium temperature for the heat release for a fluidized bed after evaporation of the water for a 50% concentration of spent liquor and 1 pound of liquor solid, without recirculation or other mixing of product gases and solids.

TABLE 2

| Percent of theoretical air | 10 | 15 | 20 | 25 | 30 | 35 |
|---|---|---|---|---|---|---|
| Pounds of air | 0.40 | 0.60 | 0.80 | 1.00 | 1.20 | 1.40 |
| Heat release (B.t.u.) | 500 | 750 | 1,000 | 1,250 | 1,500 | 1,750 |
| Weight of solids and gas from solids ×0.25 (B.t.u./° F.) | 0.25 | 0.25 | 0.25 | 0.25 | 0.25 | 0.25 |
| Weight of air and gas from air ×0.25 (B.t.u./° F.) | 0.10 | 0.15 | 0.20 | 0.25 | 0.30 | 0.35 |
| Total heat capacity of gas and solid in bed (B.t.u./° F.) | 0.35 | 0.40 | 0.45 | 0.50 | 0.55 | 0.60 |
| Equilibrium temperature rise (° F.) above starting temperature | 1,430 | 1,880 | 2,220 | 2,400 | 2,730 | 2,920 |

The first calculations show that for this liquor the concentration must be held below about 50% solids if essentially all the carbon is to be removed and if excessive temperatures, that is, above about 1300° F., are to be avoided, even with complete mixing. The calculations of the second table show that excessive temperatures will be experienced upon partial oxidation in a fluidized bed of dried liquor particles, if there is no mixing with the product gases, or other provision for cooling the bed. Thus recirculation of pyrolysis product gases within the spirit of this invention tends to limit and control the temperature rise in the fluidized bed and furnishes the necessary heat for the drying and pyrolysis of the spent liquor.

Figure 2:
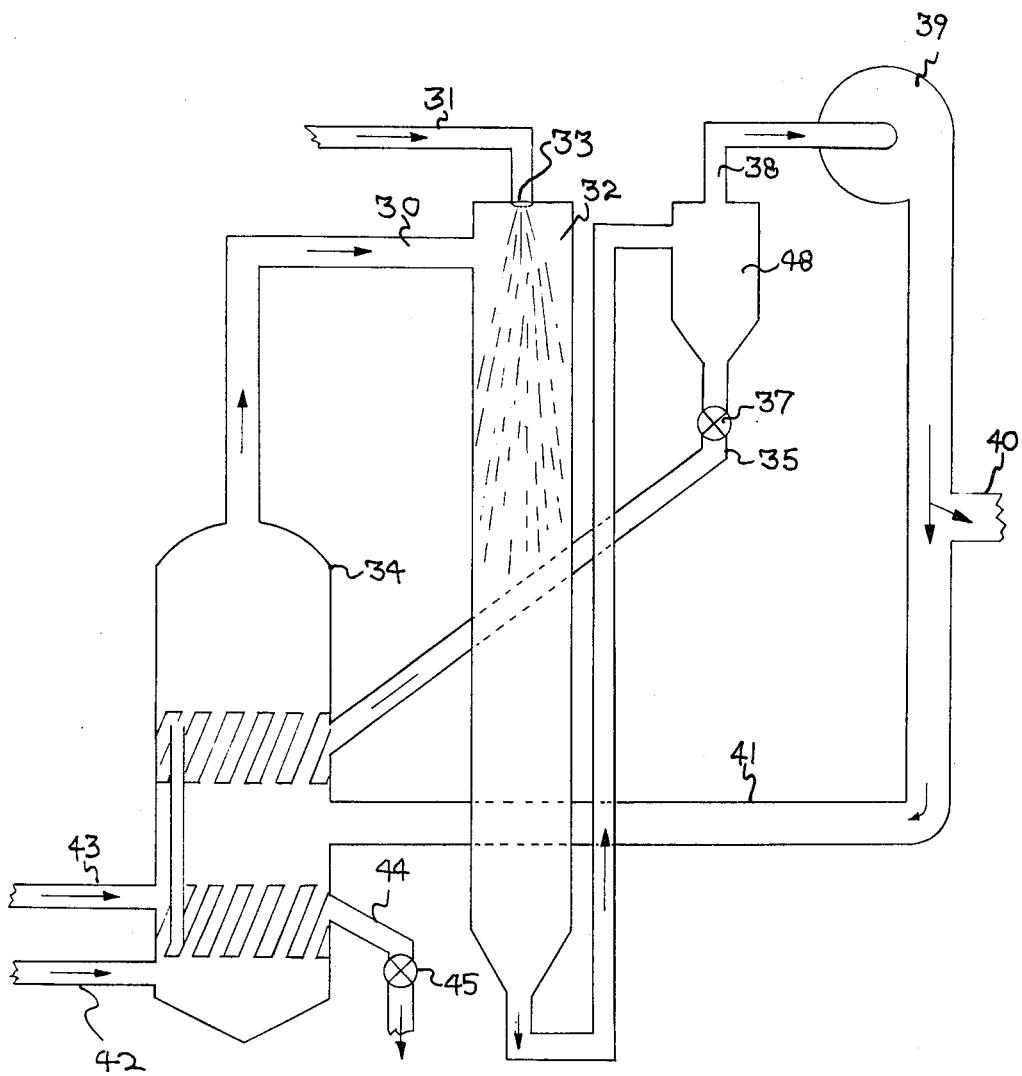

Another embodiment for performing the invention is schematically illustrated by FIG. 2. FIG. 2 sets forth a process wherein spent sulfite liquor is first sprayed into a pyrolysis chamber wherein said spent liquor is dried and pyrolyzed by hot gases entering the pyrolyzing chamber from a multi-stage fluidized bed reactor. The gases from the multi-stage fluidized bed reactor are free of residual oxygen so that the reaction gases used in the pyrolysis chamber are reducing in nature. The solid pyrolyzed product resulting from the treatment of the spent liquor in the pyrolysis reactor contains primarily sodium carbonate and carbon, which products are transferred from the pyrolyzing chamber to a cyclone separator for separation of the entrained particles from the hot gases. The separated particles are next conveyed from the cyclone separator to the first stage of a multi-stage fluidized bed where the pyrolysis is completed and part of the carbon is removed. The hot gases from the treatment are circulated to the pyrolysis chamber for the drying and initial pyrolyzing of the spent liquor. The reduced gases leaving the cyclone separator are subsequently transported in part to a heat recovery furnace (not shown) for combustion to form sulfur dioxide, which is then absorbed in a scrubbing solution of sodium carbonate and in part are recirculated to the multi-stage fluidized bed reactor as illustrated in FIG. 2. The sodium carbonate used as the scrubbing agent is obtained from the second stage fluidized bed, in which the remaining carbon is burned off with air. The hot gases leaving the cyclone separator which are conveyed through the recirculating system back to the fluidized bed provide the necessary atmosphere and temperature control for the pyrolysis within the first stage fluidized bed. Additional gases and heat are supplied to the first stage fluidized bed from the combustion of the residual carbon in the second stage fluidized bed.

In actual operation, the apparatus, as schematically illustrated in FIG. 2, performs the invention by conveying spent sulfite pulping liquor through the pressurized feed line 31 and into a pyrolyzing reactor 32. The spent pulping liquor containing about 35 to 55% solids enters the reactor 32 through an atomizing nozzle 33 attached to the end of line 31. The nozzle sprays a cone of the spent liquor into the pyrolyzing reactor 32. In the reactor, the spent liquor comes into immediate contact with hot gases entering the reactor at the top of the pyrolyzing reactor 32. The hot gases enter the pyrolyzing reactor 32 from pipe line 30, and are produced as a result of the heat generated in the multi-stage fluidized bed reactor 34. In the pyrolyzing reactor 32, the neutral spent sulfite pulping liquor will be dried and substantially pyrolyzed to form hollow or porous globules of carbonaceous char, containing inorganic chemicals of the spent waste cooking liquor. The temperature in the pyrolyzing zone is about 800° F. to 1100° F.

The carbonaceous particles consisting chiefly of sodium carbonate and carbon are conveyed from the bottom of pyrolyzing chamber 32 into a cyclone separator 48, which cyclone separator is connected to the bottom of pyrolyzing chamber 32 by pipe line 49. In the cyclone separator, the entrained particles, mainly the sodium carbonate and the carbon residue, are separated out and conveyed through line 35, suitably equipped with a rotating valve 37 for regulating outflow back to a multi-stage fluidized bed reactor 34. The hot gases leaving the top of cyclone 48 travel laterally through conduit 38 into a recirculating fan 39. The recirculating fan 39 conveys the hot gases downwardly through conduit 41 and below the first stage of the multi-stage fluidized bed 34. Some of the hot gases leave conduit 41 at outlet 40 where they are conveyed to a heat recovery furnace (not shown), for combustion into sulfur dioxide and carbon dioxide. From the heat recovery furnace, the gases are conveyed into an absorption unit (not shown), where the sulfur dioxide is scrubbed with sodium carbonate to recover the sulfur dioxide in the form of sodium sulfite.

The entrained separated particles leaving cyclone 48 enter the upper first stage of the multi-stage fluidized bed 34 through transport pipe 35. These particles are further pyrolyzed in the first fluidized bed stage of 34 with a combination of the recirculated gases from reactor 32 conveyed by duct 41 and the hot gases from the second fluidized bed stage of 34. The temperature in the first stage fluidized bed is less than about 1250° F., generally in the range of 1000° F. to 1200° F. The solid product from the first stage of the multi-stage fluidized bed 34 over-flows by gravity down a downcomer into the lower second stage bed. Residual carbon is burned out in the second stage bed of the multi-stage fluidized bed 34, with air entering through line 42. The temperature is held to a maximum of approximately 1350° F. through controlled water injection through line 43. In the first stage, the entrained particles entering the fluidized bed from the cyclone are circulated and intimately treated with the combined gases from the second stage and from recirculation containing $CO_2$, $CO$, $H_2O$ and $H_2S$. The temperature in the second stage is preferably greater than 1100° F., but less than the fusion point of the solid inorganic product, preferably at about 1300° F. Residual carbon is burned off in this second stage to give a solid product consisting primarily of sodium carbonate with a small quantity of sodium sulfate and hot gaseous products containing $CO_2$ and $H_2O$ from the cooling water as well as a small amount of $O_2$. The hot gases from this second stage fluidized bed are passed continuously with the recirculated gases from the pyrolyzing chamber 32 into the first stage fluidized bed to complete the pyrolysis of the partially pyrolyzed liquor particles. The sodium carbonate product from the second bed may, if desired, be passed to a third fluidized bed counter-current to the combustion air in the second-stage bed, to preheat the air and to cool the product. Whether discharged directly or through a preheating bed, the sodium carbonate is finally discharged from the multi-stage fluidized bed through a conduit 44, suitably equipped with a rotating control valve 45, for finally dissolving in water, the resulting solution of the sodium carbonate and water being used to scrub the flue gases from the heat recovery boiler, fed by gases leaving outlet 40, to recover the $SO_2$ contained in the heat recovery boiler, to regenerate sodium sulfite suitable for cooking liquor preparation.

Figure 3:
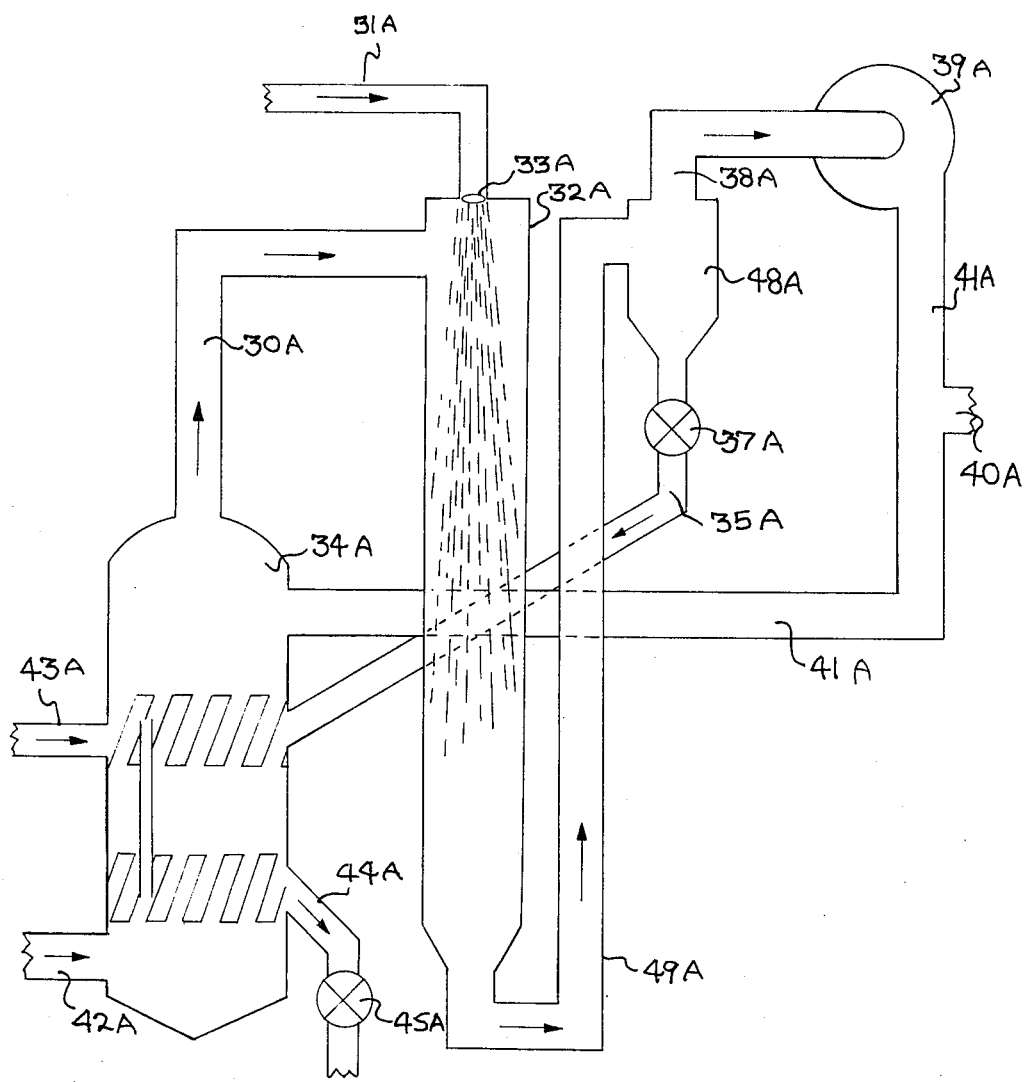

Still another embodiment for performing the invention is schematically illustrated in FIG. 3. The operation and preferred condtions are illustrated by the following description. Spent liquor at approximately 35 to 55% total solids is conveyed through line 31A to spray nozzle 33A and finely atomized into reactor 32A. In the reactor 32A, the spent liquor is dried and the solid particles are almost completely pyrolyzed by intimate mixing with hot gases from the multi-stage fluidized bed 34A. The exit temperature from the pyrolyzing reactor 32A is generally in the range from 1000° F. to 1200° F., with a preferred temperature of approximately 1100° F. These hot gases and the solid particles produced by pyrolysis in the reactor 32A are conveyed by duct 49A to the cyclone 48A, where the solids and gases are separated. The gases leave the cyclone through duct 38A to recirculation fan 39A. The fan discharges the gases into duct 41A, which recirculates part of the gases to the disengagement section in the upper part of the multi-stage fluidized bed 34A, and discharges the remainder through duct 40A to a secondary combustion chamber and boiler (not shown). These gases contain $N_2$, $CO_2$, $CO$, $H_2O$, $H_2$ and $H_2S$. The $CO$, $H_2$ and $H_2S$ are burned in the secondary combustion to supply additional heat for steam generation and to form $SO_2$, which is recovered by absorption in a solution of sodium carbonate. The solid product consisting primarily of sodium carbonate and residual carbon is conveyed through air lock valve 37A and line 35A to the upper first stage bed of the multi-stage fluidized bed 34A. The carbon is substantially burned off in this first stage bed with air which has been preheated in a lower second stage bed. The temperature in the first stage bed is maintained at approximately 1300° F. by controlled injection of water through line 43A. The product gases from this just first stage bed, containing $N_2$, $CO_2$, $H_2O$ and excess $O_2$ are combined with the recirculated gases from duct 41A, further heating these gases by the reaction of their combustibles with the $O_2$. The heated, combined gases at a temperature of about 1300° F. pass through the duct 30A to the reactor 32A where they are used to pyrolyze the spent liquor injected through the spray nozzle 33A. The solid sodium carbonate product from the upper first stage bed of the multi-stage fluidized bed 34A overflows by gravity through the downcomer into the second stage bed, where it is cooled and at the same time preheats the incoming air received from line 42A. The cooled product is discharged from the lower bed through line 44A and air lock valve 45A. A solution of this sodium carbonate is then used for absorption of $SO_2$ from the secondary combustion for preparation of sodium sulfite.

The following examples will further define the invention, but they are not to be construed as limiting, as other embodiments will be evident to those skiled in the art from the accompanying claim.

EXAMPLE 1

A bed of granules of sodium carbonate was made in a fluidized bed reactor. The reactor was six inches in diameter and had a bed height of thirty inches, operated under spouting conditions by introduction of the fluidizing gases through an opening one-half inch in diameter in the bottom plate, and using a pre-heated mixture of nitrogen carbon dioxide, hydrogen and water vapor as the fluidizing gas with a superficial gas velocity of approximately 1 to 3 feet per second. This spouted fluidized bed is further described in U.S. Pat. No. 2,786,280. The separated particles from the cyclone were introduced into the fluidized bed reactor at approximately fourteen inches from the bottom of the reactor. The particles were introduced at a rate of fifteen pounds per hour while the temperature in the reactor was maintained between 970° F. to 1080° F. A solid pelletized product was obtained, without losing fluidization in the bed.

EXAMPLE 2

The procedure employed in Example 1 was repeated herein and all conditions were as previously described. In this run, the bed was operated with a mixture of nitrogen and an air supply as the fluidizing gas and with injection of water to control the temperature of the reactor at from 970° F. to 1090° F. without a loss of any fluidization.

EXAMPLE 3

The same procedure as was employed in Example 2 was repeated in this run, and all conditions were as previously described, except that the temperature of the reactor was 1090° F. to 1280° F., and the run was performed without loss of fluidization.

EXAMPLE 4

The procedure was, as set forth in Examples 2 and 3, repeated for the run. At a temperature of 1350° F., there was a loss of fluidization.

Although the invention has been described and illustrated in detail, it is to be understood that the same is by way of illustration and example only and it is not to be taken by way of limitation.

What is claimed is:

1. A process for treating a spent neutral semi-sulfite pulping liquor for regeneration of pulping chemicals from the spent liquor wherein said process consists essentially of the steps of:

spraying into a reaction vessel consisting of an upper pyrolytic portion and a lower fluidizing bed portion a spent pulping liquor containing about 35 to 50 percent solids to pyrolyze the liquor in the upper portion of the reactor to form hollow, porous globules of carbonaceous char containing the inorganic chemicals of the spent liquor at a temperature of 900° F. to obtain a gaseous product containing entrained pyrolytic solids;

transporting the pyrolytic gaseous product from the upper portion of the reaction vessel to a cyclone separator for separating the entrained solids from the gases;

conveying the separated solids from the cyclone separator to the lower fluidized bed portion of the reaction vessel where said solids are intimately mixed with the carbonaceous char deposited directly in the fluidized bed to convert the resulting mixture by further pyrolysis, oxidation and combustion in the fluidized bed to sodium carbonate at a temperature of about 1100° F. to 1200° F.;

discharging the fluidized particles of sodium carbonate from the bed;

recirculating from the cyclone separator the pyrolytic gases essentially free of entrained solids by conveying some of the gases into the bottom of the reactor vessel for use in the fluidized bed process and for recirculation into the upper pyrolytic portion of the vessel for use in the pyrolysis of the spent liquor, the recirculating gases providing substantially all the heat for pyrolysis of the spent liquor in the reactor vessel; and conveying some of the recirculating gases to a recovery furnace for combustion into sulfur dioxide and then mixing the sulfur dioxide with the sodium carbonate obtained from the fluidized bed and dissolved in water to produce sodium sulfite for use in a pulping process.

References Cited

UNITED STATES PATENTS

| | | | |
|---|---|---|---|
| 3,397,957 | 8/1968 | Smithson | 23—129 |
| 3,333,917 | 8/1967 | Bergholm | 23—63 X |
| 3,353,906 | 11/1967 | Guerrieri | 23—129 X |
| 3,420,626 | 1/1969 | Shick et al. | 23—129 |
| 3,392,004 | 7/1968 | Chari et al. | 23—129 X |
| 3,431,165 | 3/1969 | Buxton, Jr. | 23—129 X |

FOREIGN PATENTS

| | | | |
|---|---|---|---|
| 787,292 | 6/1968 | Canada | 23—63 |
| 909,866 | 11/1962 | Great Britain | 23—63 |

EDWARD STERN, Primary Examiner

U.S. Cl. X.R.

23—63